United States Patent
Tsuda et al.

(10) Patent No.: US 10,759,924 B2
(45) Date of Patent: Sep. 1, 2020

(54) SURFACE-COATED ACETYLACETONE METAL SALT AND METHOD FOR PRODUCING SAME

(71) Applicant: SAKAI CHEMICAL INDUSTRY CO., LTD., Osaka (JP)

(72) Inventors: Koichi Tsuda, Osaka (JP); Yasuhiro Tai, Osaka (JP)

(73) Assignee: SAKAI CHEMICAL INDUSTRY CO., LTD., Osaka (JP)

(*) Notice: Subject to any disclaimer, the term of this patent is extended or adjusted under 35 U.S.C. 154(b) by 140 days.

(21) Appl. No.: 16/078,334

(22) PCT Filed: Feb. 23, 2017

(86) PCT No.: PCT/JP2017/006702
§ 371 (c)(1),
(2) Date: Aug. 21, 2018

(87) PCT Pub. No.: WO2017/159261
PCT Pub. Date: Sep. 21, 2017

(65) Prior Publication Data
US 2019/0040233 A1    Feb. 7, 2019

(30) Foreign Application Priority Data

Mar. 15, 2016 (JP) .................... 2016-051396

(51) Int. Cl.
| | | |
|---|---|---|
| C08K 9/04 | (2006.01) | |
| C08K 5/09 | (2006.01) | |
| C08L 27/06 | (2006.01) | |
| C08K 5/00 | (2006.01) | |
| C08K 5/01 | (2006.01) | |

(52) U.S. Cl.
CPC .............. *C08K 9/04* (2013.01); *C08K 5/0016* (2013.01); *C08K 5/0091* (2013.01); *C08K 5/09* (2013.01); *C08L 27/06* (2013.01); *C08K 5/01* (2013.01)

(58) Field of Classification Search
CPC ...... C08K 9/04; C08K 5/0016; C08K 5/0091; C08K 5/09; C08L 27/06
USPC .......................................................... 524/300
See application file for complete search history.

(56) References Cited

U.S. PATENT DOCUMENTS

| | | | |
|---|---|---|---|
| 5,010,123 A | 4/1991 | Worschech et al. | |
| 6,482,887 B1 * | 11/2002 | Gay ........................ | C08K 9/04 524/567 |
| 2013/0317157 A1 * | 11/2013 | Sengoku ................ | C08K 5/098 524/356 |

FOREIGN PATENT DOCUMENTS

| | | |
|---|---|---|
| JP | 1-299855 | 12/1989 |
| JP | 5-51565 | 3/1993 |
| JP | 05051565 A * | 3/1993 |
| JP | 2001-504157 | 3/2001 |
| JP | 2012-167232 | 9/2012 |

OTHER PUBLICATIONS

Translation of JP 05-051565 (application H03-240617), Mar. 2, 1993. (Year: 1993).*
International Search Report dated May 9, 2017 in International Application No. PCT/JP2017/006702.

* cited by examiner

*Primary Examiner* — Hui H Chin
(74) *Attorney, Agent, or Firm* — Wenderoth, Lind & Ponack, L.L.P.

(57) ABSTRACT

The invention provides an acetylacetone metal salt having on the surface a coating formed of a hydrocarbon wax having substantially no acid value, wherein the acetylacetone metal salt is at least one selected from the group consisting of calcium salt, magnesium salt and zinc salt.

3 Claims, No Drawings

SURFACE-COATED ACETYLACETONE METAL SALT AND METHOD FOR PRODUCING SAME

TECHNICAL FIELD

The present invention relates to a surface-coated acetylacetone metal salt and a method for producing the same. More particularly, the invention relates to a surface-coated acetylacetone metal salt having on the surface a coating formed of a hydrocarbon wax having substantially no acid value. Such a surface-coated acetylacetone metal salt is useful as a stabilizer, particularly as a heat stabilizer for a vinyl chloride resin composition, superior in stability even over time or under heating, and a process for producing the same.

Furthermore, the invention relates to a stabilizer composition for a vinyl chloride resin composition which contains such a surface-coated acetylacetone metal salt as a stabilizer and which does not deteriorate in performance as a stabilizer even over time and under heating, and a vinyl chloride resin composition containing the surface-coated acetylacetone metal salt as a stabilizer and having a superior stability over time and under heating.

BACKGROUND ART

An acetylacetone metal salt such as acetylacetone calcium, acetylacetone magnesium and acetylacetone zinc has long been known as an effective stabilizer for a chlorine-containing resin composition, in particular, a vinyl chloride-based resin composition containing vinyl chloride as a monomer unit (See Patent Documents 1 and 2).

A stabilizer for a vinyl chloride resin composition has been very often used in production of vinyl chloride resin composition as a so-called one pack in the form of a powder or granular material, that is, a stabilizer composition comprising a lubricant or other additives as well as such a stabilizer (see Patent Document 2).

The stabilizer composition comprising the above-mentioned acetylacetone metal salt as a stabilizer is obtained as a powder material or a mixture usually by mixing the acetylacetone metal salt together with a lubricant or other additives and, if necessary, other stabilizers, at room temperature. The stabilizer composition is obtained also as a granular material when the mixture is heated and granulated (see Patent Document 2).

As a stabilizer composition comprising the above-mentioned acetylacetone metal salt, there is known such a composition comprising, for example, acetylacetone calcium, wax, a diester of a saturated fatty acid of a polyhydric alcohol (for example, pentaerythritol distearate) and zinc stearate (See Patent Document 1).

As described above, the acetylacetone metal salt is useful as a stabilizer for a vinyl chloride resin composition, but on the other hand, it is known that it has various problems (see Patent Document 3).

In the course of research aiming at improving the performance of the acetylacetone metal salt and the stabilizer composition comprising the acetylacetone metal salt, the present inventors have found that the conventionally known acetylacetone metal salt deteriorates in the performance as a stabilizer over time. They have also found that, as mentioned above, while a stabilizer composition is produced in the form of granular product by mixing the acetylacetone metal salt with other ingredients, heating and granulating the resulting mixture, the acetylacetone metal salt used is in many cases decomposed to deteriorate in the performance as a stabilizer so that a stabilizer composition that stably maintains the acetylacetone metal salt without such decomposition cannot be obtained. The inventors have further found that when a vinyl chloride resin composition comprising such a known acetylacetone metal salt or a stabilizer composition containing the same is heated and molded, the resulting molded article is accompanied by undesirable thermal coloration.

A stabilizer composition comprising the aforementioned acetylacetone metal salt and a wax and zinc stearate also has the same problem.

PRIOR ART

Patent Documents

Patent Document 1: JPH1-299855A
Patent Document 2: JP 2012-167232A
Patent Document 3: JP2001-504157A

SUMMARY OF INVENTION

Technical Problem

The inventors have intensively studied to solve the above-mentioned problems involved in the acetylacetone metal salt, and as a result, they have found that, in a stabilizer composition comprising various stabilizers and other additives together with an acetylacetone metal salt as well as in a vinyl chloride resin composition comprising an acetylacetone metal salt and various other additives, the acetylacetone metal salt used is reacted, with the lapse of time or under heating, with an organic substance having an acid value, typically stearic acid or oxidized polyethylene wax or the like which is often used as a lubricant, to decompose to form acetylacetone, and as a result, the acetylacetone metal salt deteriorates in the performance as a stabilizer.

The inventors have found that when a coating comprising a hydrocarbon wax having substantially no acid value is formed on the surface of an acetylacetone metal salt, the acetylacetone metal salt is prevented from reacting with the organic substance having an acid value with the elapse of time or under heating and decomposing in a stabilizer composition or a vinyl chloride resin composition containing the acetylacetone metal salt, thereby to solve the problem that an acetylacetone metal salt, a stabilizer composition, or a vinyl chloride resin composition deteriorates in the performance as a stabilizer with over time or under heating, to obtain an acetylacetone metal salt free from deterioration in the performance as a stabilizer with over time or under heating. The inventors have thus completed the invention.

Accordingly, it is an object of the invention to provide a surface-coated acetylacetone metal salt which is useful as a stabilizer for a vinyl chloride resin composition and has superior performance stability as a stabilizer, as well as a process for producing the same. That is, the surface-coated acetylacetone metal salt of the invention has a coating on the surface comprising a hydrocarbon wax which is substantially free of acid value so that the acetylacetone metal salt is prevented from reacting with the organic material having an acid value with the lapse of time or under heating.

It is a further object of the invention is to provide a stabilizer composition for a vinyl chloride resin composition comprising the aforementioned acetylacetone metal salt as a stabilizer.

It is a still further object of the invention to provide a vinyl chloride resin composition comprising the aforementioned acetyl acetone metal salt as a stabilizer.

Solution to Problem

The invention provides an acetylacetone metal salt having on the surface a coating formed of a hydrocarbon wax having substantially no acid value, wherein the acetylacetone metal salt is at least one selected from the group consisting of calcium salt, magnesium salt and zinc salt.

According to the invention, the surface-coated acetylacetone metal salt has a coating in which the amount of the hydrocarbon wax is preferably in the range of 1 to 500 parts by weight relative to 100 parts by weight of the acetylacetone metal salt.

The invention further provides a method for producing a surface-coated acetylacetone metal salt, which comprises: stirring a mixture comprising a hydrocarbon wax having substantially no acid value and an acetylacetone metal salt under heating at a temperature equal to or higher than the melting point of the hydrocarbon wax, cooling the resultant mixture to room temperature, thereby to form a coating formed of the hydrocarbon wax having substantially no acid value on the surface of the acetylacetone metal salt, wherein the acetylacetone metal salt is selected from the group consisting of a calcium salt, a magnesium salt and a zinc salt.

According to the invention, the surface-coated acetylacetone metal salt has a coating in which the amount of the hydrocarbon wax is preferably in the range of 1 to 500 parts by weight relative to 100 parts by weight of the acetylacetone metal salt.

The invention further provides a stabilizer composition for a vinyl chloride resin composition comprising the surface-coated acetylacetone metal salt and an organic substance having an acid value.

The invention also provides a vinyl chloride resin composition comprising 0.02 to 1.0 part by weight of the surface-coated acetylacetone metal salt relative to 100 parts by weight of vinyl chloride resin.

As a preferred embodiment, the invention provides a vinyl chloride resin composition further comprising 0 to 15 parts by weight of a plasticizer and 0.01 to 1.0 part by weight of a saturated fatty acid having 12 to 20 carbon atoms relative to 100 parts by weight of a vinyl chloride resin.

In the invention, the saturated fatty acid having 12 to 20 carbon atoms is preferably stearic acid.

In the invention, the acid value means the milligrams of potassium hydroxide required to neutralize the acidic components contained in 1 g of the sample; "not substantially having an acid value" means that the average of the acid value obtained by three times measurement is 1.4 or less; and "having an acid value" means that the average of the acid value obtained by three times measurement exceeds 1.4. In addition, "the acid value is 0" means that any of the three times measurement provides the acid value of 0.

Effects of the Invention

Since the surface-coated acetylacetone metal salt according to the invention has on the surface a coating formed of a hydrocarbon wax having substantially no acid value, it is prevented from reacting with an organic substance having an acid value with time or under heating to decompose. As a result, even if the acetylacetone metal salt having a surface coating according to the invention is mixed with a substance having an acid value such as stearic acid or oxidized polyethylene wax, or granulated under heating, to obtain a stabilizer composition, the performance as a stabilizer of the surface-coated acetylacetone metal salt according to the invention does not deteriorate while it is granulated under heating, and in addition, there is no degradation of the performance over time thereafter.

In addition, according to the method of the invention, when forming a coating comprising the above-mentioned hydrocarbon wax having substantially no acid value on the surface of the acetylacetone metal salt, the acetylacetone metal salt does not react with the organic substance having an acid value. Accordingly, an acetylacetone metal salt having a surface coating is obtained without decomposition of the acetylacetone metal salt.

Further, even if the stabilizer composition and the vinyl chloride resin composition according to the invention contains a substance having an acid value such as stearic acid or oxidized polyethylene wax together with the surface-coated acetylacetone metal salt, the acetylacetone metal salt does not decompose to acetylacetone, but it maintains the performance as a stabilizer because the surface-coated acetylacetone metal salt is prevented from direct contact with the substance having an acid value on account of the coating formed of the hydrocarbon wax it has on the surface.

Therefore, the stabilizer composition and the vinyl chloride resin composition according to the invention are stable even over time and even under heating, and do not suffer coloration.

Embodiments of Invention

The surface-coated acetylacetone metal salt according to the invention is an acetylacetone metal salt having on the surface a coating comprising a hydrocarbon wax having substantially no acid value, wherein the acetylacetone metal salt is at least one selected from the group consisting of calcium salt, magnesium salt and zinc salt.

The wax used in the invention is a hydrocarbon wax which has substantially no acid value, is solid at ordinary temperature, and has a melting point of 165° C. or less, and which has preferably a viscosity of 5000 mPa·s or less at a temperature of 165° C. In the invention, the room temperature refers to a temperature in the range of 5 to 35° C.

In the invention, the coating comprising the hydrocarbon wax refers to a coating or film formed when the hydrocarbon wax melts and solidifies on the surface of particles of the acetylacetone metal salt. It preferably means a coating or film formed continuously over the entire surface of particles of an acetylacetone metal salt.

When the hydrocarbon wax to form the coating on the surface of the acetylacetone metal salt has an acid value, the acetylacetone metal salt decomposes into acetylacetone with the lapse of time or under heating, and as a result, the performance as the stabilizer of the acetylacetone metal salt deteriorates with time or under heating.

According to the invention, it is particularly preferable that the hydrocarbon wax to form a coating on the surface of the acetylacetone metal salt has an acid value of 0.

Examples of the hydrocarbon wax having substantially no acid value preferably used in the invention include, for instance, FT (Fischer-Tropsch) wax such as paraffin wax and microcrystalline wax, and polyolefin wax such as polyethylene wax and polypropylene wax. In particular, a hydrocarbon wax having an acid value of 0 is preferred.

The surface-coated acetylacetone metal salt according to the invention has a coating comprising the hydrocarbon wax in an amount in the range of 1 to 500 parts by weight, preferably 3 to 500 parts by weight, relative to 100 parts by weight of the acetylacetone metal salt.

The surface-coated acetylacetone metal salt according to the invention as described above is obtained by stirring a mixture comprising a hydrocarbon wax having substantially no acid value and an acetylacetone metal salt under heating at a temperature equal to or higher than the melting point of the hydrocarbon wax, cooling the resulting mixture to room temperature, thereby forming on the surface of the acetylacetone metal salt a coating comprising the hydrocarbon wax.

In the invention, the mixture comprising the hydrocarbon wax and the acetylacetone metal salt is preferably a mixture consisting of the hydrocarbon wax and the acetylacetone metal salt. Therefore, the above-mentioned mixture, of course, does not contain an organic substance having an acid value.

According to the invention, the surface-coated acetylacetone metal salt is preferably prepared by first putting an acetylacetone metal salt into a high-speed stirring mixer, then a hydrocarbon wax, and then the resulting mixture is stirred until the resulting mixture reaches an appropriate temperature not lower than the melting point of the hydrocarbon wax. Then, heating and stirring are stopped, and the obtained mixture is allowed to cool to ambient temperature, thereby a target surface-coated acetylacetone metal salt is obtained. In this method, the hydrocarbon wax is used preferably in an amount in the range of 1 to 100 parts by weight relative to 100 parts by weight of the acetylacetone metal salt.

As an another method according to the invention, the surface-coated acetylacetone metal salt is prepared by first putting a hydrocarbon wax in a suitable container, heating it to an appropriate temperature not lower than the melting point thereof to obtain a melt, and subsequently, a metal salt of acetylacetone is added to the melt, and the resulting mixture is heated and stirred at the above temperature, and then allowed to cool to ambient temperature to be solidified, and the solidified product thus obtained is pulverized to obtain a surface-coated acetylacetone metal salt. In this method, the hydrocarbon wax is preferably used in an amount of 100 to 500 parts by weight relative to 100 parts by weight of the acetylacetone metal salt, although not particularly limited thereto.

When the mixture comprising a hydrocarbon wax and an acetylacetone metal salt is stirred under heating at an appropriate temperature equal to or higher than the melting point of the hydrocarbon wax, the mixture is usually stirred until it reaches an appropriate temperature equal to or higher than the melting point of the wax, and then the heating is stopped promptly, then the thus treated mixture is allowed to cool to ambient temperature, thereby the intended surface-coated acetylacetone metal salt is obtained.

However, if necessary, the mixture comprising the hydrocarbon wax and the acetylacetone metal salt is stirred under heating to an appropriate temperature equal to or higher than the melting point of the hydrocarbon wax and then further stirred at that temperature for an appropriate time, and then heating is stopped, and the thus treated mixture may be allowed to cool to ambient temperature.

Thus, according to the invention, the hydrocarbon wax is used usually in an amount in the range of 1 to 500 parts by weight, preferably in the range of 3 to 500 parts by weight, relative to 100 parts by weight of the acetylacetone metal salt.

In the invention, therefore, the surface-coated acetylacetone metal salt may be such that each of the particles of the metal salt has a coating formed of the hydrocarbon wax on the surface, or plural particles of the metal salt share a coating formed of the hydrocarbon wax. In the latter case, while the hydrocarbon wax contains plural particles of the metal salt, it melts and solidifies to provide a surface-coated acetylacetone metal salt. Thus, the surface-coated acetylacetone metal salt may be obtained in the form of lump. Such lump may be used as it is as a stabilizer, or may be pulverized and used in the form of powder, as necessary.

The stabilizer composition for vinyl chloride resin composition according to the invention comprises the above-mentioned surface coated acetyl acetone metal salt and an organic substance having an acid value.

The vinyl chloride resin is not particularly limited in the invention, but specific examples thereof include, for example, polyvinyl chloride, chlorinated polyvinyl chloride, polyvinylidene chloride, chlorinated polyethylene, vinyl chloride-vinyl acetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride terpolymer, vinyl chloride-styrene-acrylonitrile copolymer, vinyl chloride-butadiene copolymer, vinyl chloride-isoprene copolymer, vinyl chloride-chlorinated propylene copolymer, vinyl chloride-vinylidene chloride-vinyl acetate terpolymer, vinyl chloride-maleic acid ester copolymer, chlorinated vinyl chloride-methacrylic acid ester copolymer, vinyl chloride-acrylonitrile copolymer, vinyl chloride-various vinyl ether copolymers, and a blend of any of the above-mentioned polymers and synthetic resin other than the above-mentioned polymers which contain no chlorine, such as acrylonitrile-styrene copolymer, ethylene-vinyl acetate copolymer, ethylene-ethyl (metha) acrylate copolymer, polyesters and the like, a block copolymer and a graft copolymer, and the like.

The stabilizer composition for vinyl chloride resin composition according to the invention comprises the above described surface-coated acetyl acetone metal salt and the organic substance having an acid value, and may additionally comprises, if necessary, other stabilizers and appropriate additives, such as a lubricant, an antioxidant, a light stabilizer, an ultraviolet absorber, a colorant, a filler, and the like. Further, the stabilizer composition for vinyl chloride resin composition according to the invention may be in the form of powder of a mixture which comprises the aforementioned surface-coated acetyl acetone metal salt and the organic substance having an acid value, and if necessary, together with the above-mentioned other stabilizers and additives, or may be in the form of granulate prepared by granulating under heating a mixture which comprises the aforementioned surface-coated acetyl acetone metal salt and the organic substance having an acid value, and if necessary, together with the above-mentioned other stabilizers and additives.

Examples of the other stabilizers include organic acid metal salts such as zinc stearate and calcium stearate, various polyhydric alcohols including dipentaerythritol and their esters with organic acids, and hydrotalcite. The organic acid metal salt is used also as a lubricant. Examples of lubricants other than the above include organic acids such as stearic acid and lauric acid and various waxes such as oxidized polyethylene wax and oxidized polypropylene wax. The wax used as a lubricant may have an acid value.

Additives such as antioxidants, colorants, fillers and the like may be used without any particular limitation as long as they are usually used in vinyl chloride resin compositions.

The organic substance having an acid value as described above is not particularly limited, and examples thereof include an organic acid such as stearic acid and a wax such as oxidized polyethylene wax.

The stabilizer composition for vinyl chloride resin composition according to the invention comprises the surface-coated acetylacetone metal salt and the organic substance having an acid value as described above. According to the invention, since the acetylacetone metal salt has on the surface a coating formed of a wax having substantially no acid value, even if the stabilizer composition contains an organic substance having an acid value together with the surface-coated acetylacetone metal salt, the surface-coated acetylacetone metal salt is not decomposed into acetylacetone by the action of an organic substance having an acid value with time or under heating. Therefore, the stabilizer composition for a vinyl chloride resin composition according to the invention has a performance as a stabilizer which is not deteriorated by heating during the production of the molded article, and in addition, the resulting molded article does not suffer coloration with time.

The vinyl chloride resin composition according to the invention contains the aforementioned surface-coated acetylacetone metal salt as a stabilizer, and may optionally contain various additives such as plasticizers, various lubricants, antioxidants, colorants, fillers and the like, as well as the other stabilizers as mentioned above.

The vinyl chloride resin composition according to the invention contains the surface-coated acetylacetone metal salt in an amount in the range of 0.02 to 1.0 part by weight, preferably 0.1 to 0.5 parts by weight, relative to 100 parts by weight of the vinyl chloride resin, and hence it has a superior stability, in particular, thermal stability.

Further, the vinyl chloride resin composition according to the invention contains a plasticizer in an amount in the range of 0 to 15 parts by weight and a saturated fatty acid having 12 to 20 carbon atoms, preferably stearic acid, in an amount of 0.01 to 1.0 part by weight, relative to 100 parts by weight of the vinyl chloride resin.

As the above-mentioned plasticizer, those conventionally used in vinyl chloride resin compositions, including, for example, phthalate type plasticizer, adipate type plasticizer, phosphate type plasticizer, polyester type plasticizer and the like, are used.

The vinyl chloride resin composition according to the invention contains the surface-coated acetylacetone metal salt as a stabilizer. Thus, even if it contains other additives, in particular, a saturated fatty acid having 12 to 20 carbon atoms and an acid value, it provides a molded article which suffers no coloration when it is produced or with the lapse of time, because even if it is heated when molding, there is no decrease in the performance as a stabilizer of the surface-coated acetylacetone metal salt, and the surface-coated acetylacetone metal salt as a stabilizer does not deteriorate in performance with time.

EXAMPLES

The invention will now be described in more detail with reference to examples of the invention together with comparative examples.

In the following, the melting point and viscosity of the wax were measured in the following manner.

Melting Point of the Wax

Measurement of melting point of the wax was carried out by raising the temperature at a heating rate of 10° C./minute under a nitrogen atmosphere using a DSC (differential scanning calorimeter).

Viscosity of Wax

A sample of wax was put in a stainless steel beaker having a capacity of 200 mL, heated to 165° C., and the viscosity of the wax was measured at the temperature using a B type viscometer.

Acid Value of Wax

The acid value of a sample of wax was measured by the following method.

(1) 2 g of sample is precisely weighed in an Erlenmeyer flask.

(2) 100 mL of a mixed solution composed of toluene:ethanol=3:1 (volume ratio) is added to the sample wax in the Erlenmeyer flask. Depending on the sample, another solvent in which the sample dissolves may be used.

(3) The wax in the Erlenmeyer flask is heated with stirring until the sample is completely dissolved to form a solution.

(4) After dissolution, two or three drops of indicator (phenolphthalein) are added to the solution, and the solution is titrated with a 0.1 mol/L ethanolic solution of potassium hydroxide.

(5) The end point is reached when the light pink color lasts for 30 seconds to provide a titration amount of the sample.

(6) A blank test is carried out in the same manner as mentioned above, and the obtained titration amount (mL) is subtracted from the titration amount (mL) of the sample.

The acid value of the sample wax is determined by the following formula.

$$A = 56.11 \text{ (molar mass of KOH)} \times D \times 0.1 \times f/C$$

In the formula,

A: acid value (mg KOH/g)

D: amount of ethanolic solution of potassium hydroxide used (mL)

f: factor of potassium hydroxide used

C: amount sampled (g).

Example 1

4 kg of acetylacetone calcium (Rodia Stub X77, manufactured by Rhodia), and then 0.4 kg of low molecular weight polyethylene wax (FT-115, manufactured by Nippon Seiro Co., Ltd., having an acid value of 0, a melting point of 110° C., and a viscosity of 200 mPa·s or less (at 165° C., the same hereinafter) were put in a high speed stirring mixer having a capacity of 20 L, and then stirred and heated until they reached 120° C. Thereafter they were allowed to cool to 25° C. to obtain acetylacetone calcium having a coating of the wax on the surface.

Example 2

4 kg of acetylacetone calcium (Rodia Stub X77, manufactured by Rhodia), and then 0.4 kg of low molecular weight polypropylene wax (Viscol 330 P, manufactured by Sanyo Chemical Industries, having an acid value of 0, a melting point of 148° C. and a viscosity of 4500 mPa·s) were put in a high speed stirring mixer having a capacity of 20 L, and then stirred and heated until they reached 150° C. Thereafter they were allowed to cool to 25° C. to obtain acetylacetone calcium having a coating of the low molecular weight polypropylene wax on the surface.

Example 3

4 kg of acetylacetone magnesium (manufactured by Sakai Chemical Industry Co., Ltd.), and then 0.4 kg of low molecular weight polyethylene wax (A-C6A, manufactured by Honeywell, having an acid value of 0, a melting point 100° C. and a viscosity of 200 mPa·s or less) were put in a high speed stirring mixer having a capacity of 20 L, and then stirred and heated until they reached 120° C. Thereafter they were allowed to cool to 25° C. to obtain acetylacetone magnesium having a coating of the low molecular weight polyethylene wax on the surface.

Example 4

4 kg of acetylacetone zinc (manufactured by Sakai Chemical Industry Co., Ltd.), and 0.4 kg of paraffin wax (Lubax 2191, manufactured by Nippon Seiro Co., Ltd., having an acid value of 0, a melting point 80° C. and a viscosity of 200 mPa·s or less) were put in a high speed stirring mixer having a capacity of 20 L, and then stirred and heated until they reached 120° C. Thereafter they were allowed to cool to 25° C. to obtain acetylacetone zinc having a coating of the paraffin wax on the surface.

Example 5

4 kg of acetylacetone calcium (Rodia Stub X77, manufactured by Rhodia) was put in a high speed stirring mixer having a capacity of 20 L, and then 0.4 kg of low molecular weight polyethylene wax (FT-115, manufactured by Nippon Seiro Co., Ltd., having an acid value of 0, a melting point of 110° C., and a viscosity of 200 mPa·s or less) and 0.4 kg of low molecular weight polypropylene wax (Viscol 550 P, manufactured by Sanyo Chemical Industries, having an acid value of 0, a melting point of 148° C. and a viscosity of 200 mPa·s) were put in the high speed stirring mixer. They were stirred and heated until they reached 150° C., and then were allowed to cool to 25° C. to obtain acetylacetone calcium having a coating of the polyethylene wax and polypropylene wax on the surface.

Example 6

5 kg of low molecular weight polyethylene wax (FT-115, manufactured by Nippon Seiro Co., Ltd., having an acid value of 0, a melting point of 110° C., and a viscosity of 200 mPa·s or less) was put in a stainless steel tank and heated to 150° C. to obtain a melt. Thereafter, 1 kg of acetylacetone calcium (Rodia Stub X77, manufactured by Rhodia) was added to the melt. The mixture was stirred for 30 minutes, and then allowed to cool to 25° C. so that the resulting mixture was solidified. The solidified product was pulverized with a atomizer to obtain acetylacetone calcium having a coating formed of the low molecular weight polyethylene wax on the surface. cl Example 7

4 kg of acetylacetone magnesium (manufactured by Sakai Chemical Industry Co., Ltd.), and then 0.4 kg of microcrystalline wax (Hi-Mic-2095, manufactured by Nippon Seiro Co., Ltd., having an acid value of 0, a melting point of 101° C. and a viscosity of 200 mPa·s or less) were put in a high speed stirring mixer having a capacity of 20 L, and then stirred and heated until they reached 120° C. Thereafter they were allowed to cool to 25° C. to obtain acetylacetone magnesium having a coating of the microcrystalline wax on the surface.

Example 8

4 kg of acetylacetone calcium (Rodia Stub X77, manufactured by Rhodia), and then 0.4 kg of low molecular weight polyethylene wax (Hi Wax 220 MP, manufactured by Mitsui Chemicals, having an acid value of 1.26, a melting point of 100° C., and a viscosity of 200 mPa·s or less) were put in a high speed stirring mixer having a capacity of 20 L, and then stirred and heated until they reached 120° C. Thereafter they were allowed to cool to 25° C. to obtain acetylacetone calcium having a coating of the low molecular weight polyethylene wax on the surface.

Example 9

4 kg of acetylacetone calcium (Rodia Stub X77, manufactured by Rhodia), and then 0.2 kg of low molecular weight polyethylene wax (FT-115 manufactured by Nippon Seiro Co., Ltd., having an acid value of 0, a melting point of 110° C., and a viscosity of 200 mPa·s or less) were put in a high speed stirring mixer having a capacity of 20 L, and then stirred and heated until they reached 120° C. Thereafter they were allowed to cool to 25° C. to obtain acetylacetone calcium having a coating of the low molecular weight polyethylene wax on the surface.

Comparative Example 1

4 kg of acetylacetone calcium (Rodia Stub X77, manufactured by Rhodia), and then 0.4 kg of stearic acid (having an acid value of 200 and a melting point of 69° C.) and 4 kg of hexane were put in a high speed stirring mixer having a capacity of 20 L, and then stirred and heated until they reached 65° C. Then, the resulting mixture was dried under a reduced pressure of 350 hPa at 65° C. for 1 hour, and then further dried under a reduced pressure of 15 hPa at 65° C. for 1 hour, followed by allowing to cool to 25° C. to obtain acetylacetone calcium having a coating of stearic acid on the surface.

Comparative Example 2

4 kg of acetylacetone calcium (Rodia Stub X77, manufactured by Rhodia), and then 0.4 kg of stearyl alcohol (KALCOR 8098 manufactured by Kao Corporation, having an acid value of 0, and a melting point of 59° C.) and 4 kg of hexane were put in a high speed stirring mixer having a capacity of 20 L, and then stirred and heated until they reached 60° C. Then, the resulting mixture was dried under a reduced pressure of 330 hPa at 60° C. for 1 hour, and then further dried under a reduced pressure of 10 hPa at 60° C. for 1 hour, followed by allowing to cool to 25° C. to obtain acetylacetone calcium having a coating of stearyl alcohol on the surface.

Comparative Example 3

4 kg of acetylacetone calcium (Rodia Stub X77, manufactured by Rhodia), and then 0.1 kg of silicone oil (KF-96, manufactured by Toshiba Silicone KK) were put in a high speed stirring mixer having a capacity of 20 L, and then stirred and heated until they reached 100° C. Thereafter they were allowed to cool to 25° C. to obtain acetylacetone calcium having a coating of the silicone oil on the surface.

Comparative Example 4

Acetylacetone calcium (Rhodia Stab X77, manufactured by Rhodia Co., Ltd.) having on the surface no surface coating was taken as acetylacetone calcium according to Comparative Example 4.

Comparative Example 5

4 kg of acetylacetone calcium (Rodia Stub X77, manufactured by Rhodia), and then 0.4 kg of low molecular weight polyethylene wax (FT-115, manufactured by Nippon Seiro Co., Ltd., having an acid value of 0, a melting point of 110° C., and a viscosity of 200 mPa·s or less) were put in a high speed stirring mixer having a capacity of 20 L, and then stirred and heated until they reached 40° C. Thereafter they were allowed to cool to 25° C. to obtain a mixture of acetylacetone calcium and the low molecular weight polyethylene wax.

Comparative Example 6

4 kg of acetylacetone calcium (Rodia Stub X77, manufactured by Rhodia), and then 0.4 kg of low molecular weight polyethylene wax (Hi Wax 4202E, manufactured by Mitsui Chemicals, having an acid value of 17, a melting point of 100° C., and a viscosity of 200 mPa·s or less) were put in a high speed stirring mixer having a capacity of 20 L, and then stirred and heated until they reached 120° C. Thereafter they were allowed to cool to 25° C. to obtain acetylacetone calcium having a coating of the low molecular weight polyethylene wax on the surface.

Comparative Example 7

4 kg of acetylacetone calcium (Rodia Stub X77, manufactured by Rhodia), and then 0.4 kg of ester wax (Roxyol 2899, manufactured by Emery Oleochemique, having an acid value of 0.7, a melting point of 65° C. and a viscosity of 200 mPa·s or less) were put in a high speed stirring mixer having a capacity of 20 L, and then stirred and heated until they reached 120° C. Thereafter they were allowed to cool to 25° C. to obtain acetylacetone calcium having a coating of the ester wax on the surface.

Comparative Example 8

448 g (1.7 moles) of stearic acid for industrial use (purified stearic acid 550V manufactured by Kao Corporation, composed of stearic acid and palmitic acid, each about 50% by weight, having a melting point 58° C.) and 300 g of paraffin wax (Lubax 2191, manufactured by Nippon Seiro Co., Ltd., having an acid value of 0, a melting point 80° C. and a viscosity of 200 mPa·s or less) were heated to 130° C. to obtain a melt. 69 g of zinc oxide (0. 85 moles, half mole of stearic acid used) was added to the melt while the melt was stirred, and then the melt was stirred at 140° C. for 30 minutes under a reduced pressure (20 hPa) until the zinc oxide was dissolved in the melt.

After cooling the obtained melt to 110° C., 555 g of calcium acetylacetone (an amount corresponding to 54 parts by weight of paraffin wax relative to 100 parts by weight of calcium acetylacetonate) was added to the melt, stirred for 30 minutes, allowed to cool to 25° C., and pulverized with an atomizer to obtain acetylacetone calcium having a coating formed of zinc stearate and the paraffin wax on the surface.

Comparative Example 9

4 kg of acetylacetone calcium (Rodia Stub X77, manufactured by Rhodia), and then 0.4 kg of pentaerythritol distearate (UNISTAR H-476 D, manufactured by NOF Corporation, having an acid value of 1 or less, a melting point 53° C. and a viscosity of 200 mPa·s or less) were put in a high speed stirring mixer having a capacity of 20 L, and then stirred and heated until they reached 80° C. Thereafter they were allowed to cool to 25° C. to obtain acetylacetone calcium having a coating of the pentaerythritol distearate on the surface.

Comparative Example 10

2 kg of zinc stearate (SZ-P, manufactured by Sakai Chemical Industry Co., Ltd., having an acid value of less than 1, and a melting point of 125° C.) was put in a stainless steel tank and heated to 140° C. to obtain a melt. Thereafter, 1 kg of acetylacetone calcium (Rodia Stub X77, manufactured by Rhodia) was added to the melt, stirred for 30 minutes, and then allowed to cool to 25° C. so that the resulting mixture was solidified. The solidified product was pulverized with an atomizer to obtain acetylacetone calcium having a coating formed of zinc stearate on the surface.

There was prepared a stabilizer composition which contained, as a stabilizer, each of the surface-coated or non-surface-coated acetylacetone metal salts obtained as described above. The stabilizer composition thus prepared was blended with vinyl chloride resin, and the resulting resin composition was molded into a rolled sheet and a press sheet. The degree of coloration of each of the sheets was visually examined to evaluate the performance of the surface coated acetylacetone metal salt as a stabilizer based on the following tests.

Test Method 1 (Test of Change of Performance by Heating Granulation)

The following composition was prepared.

TABLE 1

| Components of Composition | Weight (kg) |
|---|---|
| Hydrotalcite (HT-1 manufactured by Sakai Chemical Industry Co., Ltd.) | 1 |
| Zinc stearate (SZ-P manufactured by Sakai Chemical Industry Co., Ltd.) | 2 |
| Calcium stearate (SC-P manufactured by Sakai Chemical Industry Co., Ltd.) | 0.3 |
| Dipentaerythritol (Dipentarit mabufactured by Koei Chemical Co., Ltd.) | 0.3 |
| Stearic acid (powder searic acid maunufactured by NOF Corporation) | 0.5 |
| Wax ("Hi Wax 220MP", manufactured by Mitsui Chemicals, Inc.) | 0.3 |
| (Total) | 4.4 |

0.5 kg of each of the surface-coated or non-surface-coated acetylacetone metal salts obtained in the above Examples and Comparative Examples (samples) and 4.4 kg of the above composition were put in a high speed stirring mixer having a capacity of 20 L, and stirred and heated to a temperature of 80° C., and then allowed to cool to 25° C., thus obtaining a granular stabilizer composition obtained by heating granulation.

2 parts by weight of the above granular stabilizer composition was blended with 100 parts by weight of vinyl chloride resin (TK-1000, manufactured by Shin-Etsu Chemical Co., Ltd.). The thus obtained vinyl chloride resin composition was kneaded at 180° C. for 5 minutes using 8 inch rolls to provide a rolled sheet. The effect of preventing thermal coloration of the surface-coated or non-surface coated acetylacetone metal salt blended as a stabilizer with the vinyl chloride resin was visually evaluated on the rolled sheet.

Further, the rolled sheet was pressed at 190° C. for 5 minutes to obtain a pressed sheet. The effect of preventing thermal coloration of the surface-coated or non-surface coated acetylacetone metal salt blended as a stabilizer with the vinyl chloride resin was visually evaluated on the pressed sheet. In addition, the odor of the granular stabilizer composition was also evaluated.

The results are shown in Tables 2 and 3. Evaluation of thermal coloration of the obtained rolled sheet and pressed sheet was based on the following criteria. When thermal coloration was not recognized on the sheet, it was evaluated as ○; when a slight coloration was observed on the sheet, but the coloration was within an allowable range, it was evaluated as Δ; and a remarked coloration was observed on the sheet, it was evaluated as ×. The odor of the stabilizer composition was evaluated according to the following criteria. When odor was not observed, it was evaluated as ○; when odor was observed somewhat, but it was within an allowable range, it was evaluated as Δ; and when odor was remarkable, it was evaluated as ×.

TABLE 2

| | Examples | | | | | | | | |
|---|---|---|---|---|---|---|---|---|---|
| | 1 | 2 | 3 | 4 | 5 | 6 | 7 | 8 | 9 |
| Coloration of rolled sheet | ○ | ○ | ○ | ○ | ○ | ○ | ○ | Δ | ○ |
| Coloration of pressedd sheet | ○ | ○ | ○ | ○ | ○ | ○ | ○ | Δ | ○ |
| Odor of stabilizer composition | ○ | ○ | ○ | ○ | ○ | ○ | ○ | ○ | ○ |

TABLE 3

| | Comparative Examples | | | | | | | | | |
|---|---|---|---|---|---|---|---|---|---|---|
| | 1 | 2 | 3 | 4 | 5 | 6 | 7 | 8 | 9 | 10 |
| Coloration of rolled sheet | × | Δ | Δ | × | × | × | × | Δ | × | × |
| Coloration of pressedd sheet | × | × | × | × | × | × | × | × | × | × |
| Odor of stabilizer composition | × | Δ | Δ | × | × | × | × | Δ | × | × |

Except for the vinyl chloride resin composition containing the stabilizer composition which contained the surface-coated acetylacetone metal salt according to Example 8, the vinyl chloride resin composition containing a stabilizer composition which contained the surface-coated acetylacetone metal salt according to Examples of the invention was found to cause no thermal coloration either on a rolled sheet or a pressed sheet while it was produced.

The vinyl chloride resin composition containing the surface-coated acetylacetone metal salt which contained the stabilizer composition according to Example 8 provided a rolled sheet and a pressed sheet on which a slight thermal coloration was observed, but it was such that it was practically acceptable.

Any of the stabilizer compositions containing the surface-coated acetylacetone metal salt according to the examples was found to have no odor.

In Comparative Example 4, acetylacetone calcium having no coating on the surface was formed to a granular stabilizer composition by heating granulation together with the composition as shown in Table 1. The stabilizer composition was blended with a vinyl chloride resin, and the obtained vinyl chloride resin composition was molded into a rolled sheet and a pressed sheet, and thermal coloration was examined on the sheets. It seemed that when the acetylacetone calcium was heated and granulated together with the composition to obtain a granular stabilizer composition, most of the acetylacetone calcium was decomposed into acetylacetone by stearic acid contained in the composition. Thus, the vinyl chloride resin composition containing such a stabilizer composition having deteriorated performance as a stabilizer because of acetylacetone contained therein provided a roll sheeted and a pressed sheet on which remarkable thermal coloration was observed.

In Comparative Example 1, a surface coating of stearic acid was formed on the surface of acetylacetone calcium. When such acetylacetone calcium was surface-coated with stearic acid as described above, it seemed that most of the acetylacetone calcium was decomposed into acetylacetone by stearic acid contained in the composition when the acetylacetone was surface-coated under heating, or when the surface-coated acetylacetone calcium was heated and granulated with the above-mentioned composition to form a granular stabilizer composition under heating to obtain a granular stabilizer composition. Thus, the vinyl chloride resin composition containing such a stabilizer composition containing having a deteriorated performance as a stabilizer because of acetylacetone contained therein provided a rolled sheet and a pressed sheet on which remarkable thermal coloration was observed.

The surface-coated acetylacetone calcium according to Comparative Example 2 had a coating formed of stearyl alcohol having an acid value of 0 on the surface. When such surface-coated acetylacetone calcium was heated and granulated together with the above-mentioned composition to obtain the granular stabilizer composition, a portion of the coating formed of stearyl alcohol on the surface of particles of the acetylacetone calcium was dissolved and removed under heating by stearic acid contained in the composition, and thus the acetylacetone calcium was decomposed. As a result, the surface-coated acetylacetone calcium deteriorated in performance as a stabilizer. Thus, thermal coloration was observed on the rolled sheet obtained, and remarkable thermal coloration was observed on the pressed sheet obtained.

The surface-coated acetylacetone calcium according to Comparative Example 3 had a coating formed of silicone oil on the surface. Although the reason was not yet clear, it seemed that the surface-coated acetylacetone calcium was unable to prevent decomposition of acetylacetone metal salt by stearic acid when it came into contact with stearic acid under heating.

In Comparative Example 5, there was obtained a mixture of acetylacetone calcium and a hydrocarbon wax having an acid value of 0 by simply mixing them at a temperature lower than the melting point of the wax. Such acetylacetone calcium had on the surface no coating formed by melting and solidifying a hydrocarbon wax. Thus, as in the case of Comparative Example 4, the vinyl chloride resin composition blended with the above mixture provided a rolled sheet and a pressed sheet on which remarkable thermal coloration was observed, as the acetylacetone calcium did not function as a stabilizer when the vinyl chloride resin composition was formed into the sheets.

The surface-coated acetylacetone calcium according to Comparative Example 6 had on the surface a coating formed of a low molecular weight polyethylene wax having an acid value. It seemed that most of such surface-coated acetylacetone calcium was decomposed into acetylacetone by the low-molecular-weight polyethylene wax under heating when it was surface-coated, or by stearic acid contained in the composition when it was granulated with the composition under heating to form a granular stabilizer composition. Thus, the vinyl chloride resin composition containing such a stabilizer composition having a deteriorated performance as a stabilizer because of acetylacetone contained therein provided a rolled sheet and a pressed sheet on which remarkable thermal coloration was observed.

The surface-coated acetylacetone calcium according to Comparative Example 7 had on the surface a coating formed of an ester wax having substantially no acid value. It seemed that most of such surface-coated acetylacetone calcium was decomposed into acetylacetone by stearic acid contained in the composition when it was granulated with the composition under heating to form a granular stabilizer composition. Thus, the vinyl chloride resin composition containing such a stabilizer composition having a deteriorated performance as a stabilizer because of acetylacetone contained therein provided a rolled sheet and a pressed sheet on which remarkable thermal coloration was observed.

The surface-coated acetylacetonate calcium according to Comparative Example 8 was obtained by adding acetylacetone calcium to a melt containing zinc stearate and hydrocarbon wax to form a coating on the surface thereof composed of zinc stearate and hydrocarbon wax. Neither zinc stearate nor the hydrocarbon wax used had substantially an acid value. However, when such surface-coated calcium acetylacetonate was heated and granulated together with the above-mentioned composition to prepare a granular stabilizer composition, among the above-mentioned coating, the coating formed of zinc oxide was dissolved into stearic acid. And, as a result, a part of the acetylacetone calcium was decomposed into acetylacetone, so that it seemed that either the rolled sheet or the pressed sheet suffered thermal coloration.

The surface-coated acetylacetone calcium according to Comparative Example 9 had on the surface a coating formed of stearic acid ester of a polyhydric alcohol having substantially no acid value. It seemed that when such surface-coated calcium acetylacetonate was heated and granulated together with the above-mentioned composition to prepare a granular stabilizer composition, most of the acetylacetone calcium was decomposed into acetylacetone. Thus, the vinyl chloride resin composition containing such a stabilizer composition having a deteriorated performance as a stabilizer because of acetylacetone contained therein provided a rolled sheet and a pressed sheet on which remarkable thermal coloration was observed.

The surface-coated calcium acetylacetonate according to Comparative Example 10 had on the surface a coating formed of zinc stearate having substantially no acid value. When such a surface-coated acetylacetone calcium was heated and granulated together with the above-mentioned composition to form a granular stabilizer composition, the coating was dissolved and removed by stearic acid under heating, and the acetylacetone calcium was easily decomposed into acetylacetone. Thus, it seemed that the acetylacetone calcium came to have a deteriorated function as a stabilizer. As a result, the vinyl chloride resin composition containing such a stabilizer composition having a deteriorated performance as a stabilizer because of acetylacetone contained therein provided a rolled sheet and a pressed sheet on which remarkable thermal coloration was observed.

Any of the stabilizer compositions containing the surface-coated acetylacetone metal salt according to Comparative Examples 1 to 10 was confirmed to have a stimulated odor of free acetylacetone produced by the reaction of acetylacetone metal salt and stearic acid.

Test Method 2 (Time-Dependent Change of Simple Mixture)

0.5 kg of any one of the surface-coated acetylacetone metal salts (sample) obtained in the above Examples and Comparative Examples and 4.4 kg of the composition were put in a 20 L capacity conical mixer, and mixed at room temperature (30° C.) to obtain a stabilizer composition in the form of simple mixture.

Immediately after the preparation of the stabilizer composition, a portion of the stabilizer composition, i.e., 2 parts by weight of the stabilizer composition was taken and added to 100 parts by weight of vinyl chloride resin (TK-1000 manufactured by Shin-Etsu Chemical Co., Ltd.). The resulting resin composition was kneaded with 8 inch rolls at 180° C. for 5 minutes to obtain a rolled sheet. The coloration preventing effect of the stabilizer composition was visually evaluated on the rolled sheet. Further, the rolled sheet was pressed at 190° C. for 5 minutes to obtain a pressed sheet. The coloration preventing effect of the stabilizer composition was visually evaluated also on the pressed sheet.

A portion of the above stabilizer composition was placed in a polyethylene bag and stored at 30° C. for one month. Then, 2 parts by weight of the stabilizer composition was taken out and was mixed with 100 parts by weight of vinyl chloride resin (TK-1000 (Shin-Etsu Chemical Co., Ltd.). The resultant vinyl chloride resin composition was kneaded at 180° C. for 5 minutes on 8 inch rolls to obtain a rolled sheet. The coloration preventing effect of the stabilizer composition was visually evaluated on the rolled sheet. Further, the rolled sheet was pressed at 190° C. for 5 minutes to obtain a pressed sheet. The coloring preventing effect of the stabilizer composition was visually evaluated also on the pressed sheet.

The results are shown in Tables 4 and 5. The coloration of the rolled sheet and the pressed sheet produced using the vinyl chloride resin composition blended with the stabilizer composition immediately after production are shown as coloration (1) of the rolled sheet and coloration (1) of the pressed sheet, respectively. The coloration of the rolled sheet and the pressed sheet produced using the vinyl chloride resin composition containing a stabilizer composition stored at 30° C. for 1 month are shown as coloration of the rolled sheet (2) and the coloration of the pressed sheet (2), respectively. The criteria for evaluating the coloration of the sheets are the same as described hereinbefore.

TABLE 4

| | Examples | | | | | | | | |
|---|---|---|---|---|---|---|---|---|---|
| | 1 | 2 | 3 | 4 | 5 | 6 | 7 | 8 | 9 |
| Coloration of rolled sheet (1) | ◯ | ◯ | ◯ | ◯ | ◯ | ◯ | ◯ | ◯ | ◯ |
| Coloration of pressed sheet (1) | ◯ | ◯ | ◯ | ◯ | ◯ | ◯ | ◯ | ◯ | ◯ |
| Coloration of rolled sheet (2) | ◯ | ◯ | ◯ | ◯ | ◯ | ◯ | ◯ | Δ | ◯ |
| Coloration of pressed sheet (2) | ◯ | ◯ | ◯ | ◯ | ◯ | ◯ | ◯ | Δ | ◯ |

TABLE 5

|  | Comparative Examples | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Coloration of rolled sheet (1) | ○ | ○ | ○ | ○ | ○ | ○ | ○ | ○ | ○ | ○ |
| Coloration of pressed sheet (1) | ○ | ○ | ○ | ○ | ○ | ○ | ○ | ○ | ○ | ○ |
| Coloration of rolled sheet (2) | X | X | X | X | X | X | X | X | X | X |
| Coloration of pressed sheet (2) | X | X | X | X | X | X | X | X | X | X |

A vinyl chloride resin composition compound containing any of the the stabilizer compositions immediately after production according to Examples 1 to 7 and Example 9 or after storage for one month after the production provided a rolled sheet and a pressed sheet with no thermal coloration. The stabilizer composition stabilizer according to Example 8, either immediately after the production or after storage for one month after the production, provided a rolled sheet and a pressed sheet which were found to be slightly colored for the reasons described above. However, the coloration was within an allowable range for practical use.

However, any of the stabilizer compositions according to Comparative Examples 1 to 10, either immediately after the production or after storage for one month after production, provided a rolled sheet and a pressed sheet on which a significant thermal coloration was observed.

The invention claimed is:

1. A vinyl chloride resin composition comprising a surface-coated acetylacetone metal salt in an amount of 0.02 to 1.0 part by weight and a saturated fatty acid having 12 to 20 carbon atoms as an organic substance having an acid value in an amount of 0.01 to 1.0 part by weight, each relative to 100 parts by weight of a vinyl chloride resin,
   wherein the acetylacetone metal salt is at least one selected from the group consisting of calcium salt, magnesium salt and zinc salt,
   wherein the surface-coated acetylacetone metal salt has on the surface a coating formed of a hydrocarbon wax having substantially no acid value,
   wherein "having substantially no acid value" means that the average of the acid value obtained by measuring three times is 1.4 or less, and
   wherein "having an acid value" means that the average of the acid value obtained by measuring three times exceeds 1.4.

2. The vinyl chloride resin composition according to claim 1, further comprising 0 to 15 parts by weight of a plasticizer relative to 100 parts by weight of the vinyl chloride resin.

3. The vinyl chloride resin composition according to claim 1, wherein the saturated fatty acid having 12 to 20 carbon atoms is stearic acid.

* * * * *